United States Patent Office.

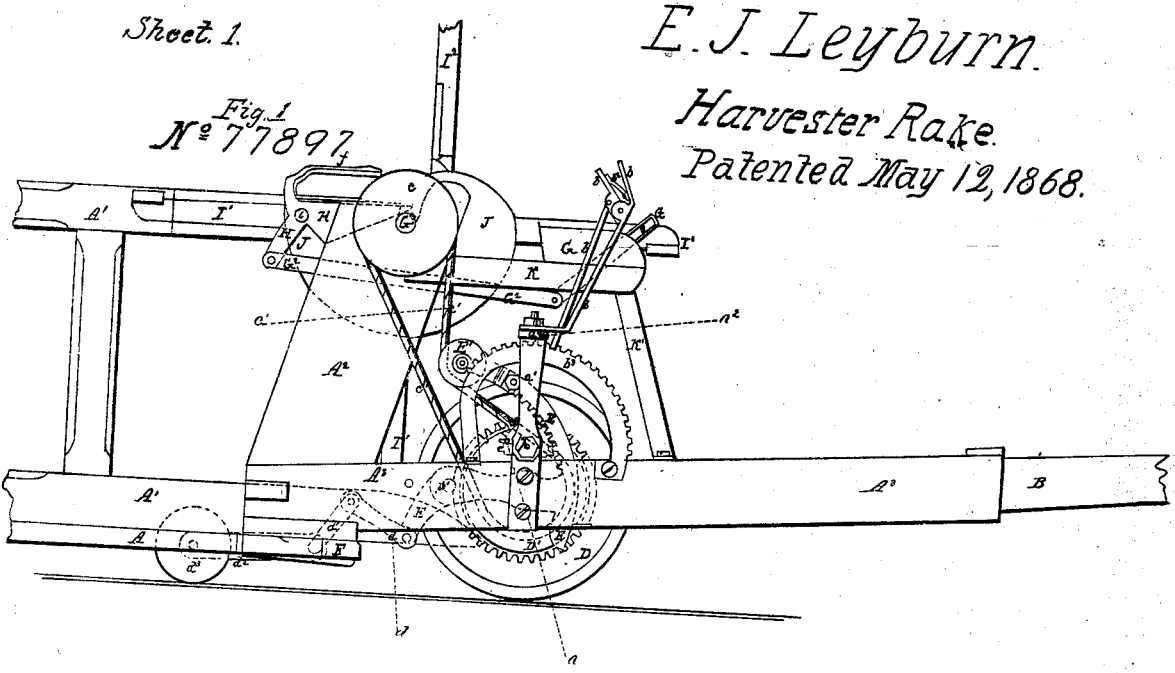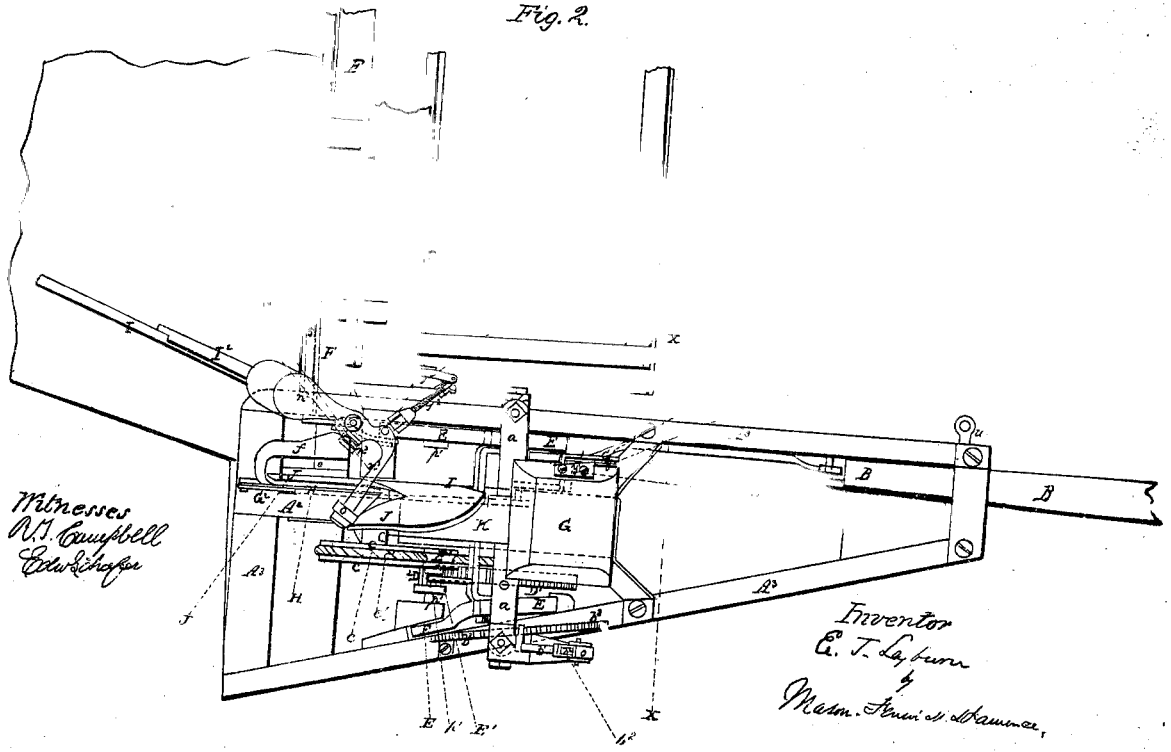

E. I. LEYBURN, OF LEXINGTON, VIRGINIA.

Letters Patent No. 77,897, dated May 12, 1868.

IMPROVEMENT IN HARVESTERS.

*The Schedule referred to in these Letters Patent and making part of the same.*

TO ALL WHOM IT MAY CONCERN:

Be it known that I, E. I. LEYBURN, of Lexington, and State of Virginia, have invented certain new and useful Improvements in Harvesting-Machinery; and I do hereby declare that the following is a full, clear, and exact description thereof, reference being had to the accompanying drawings, making a part of this specification, in which—

Figure 1, sheet 1, is an elevation of the outer side of the machine, with finger-bar and platform depressed, and a portion of the platform broken away.

Figure 2 is a top view of fig. 1.

Figure 3, sheet 2, is a similar view of the same parts shown in fig. 1, indicating the finger-bar and platform elevated.

Figure 4, sheet 2, is an elevation of the machine, looking toward the grain-side of it, with a portion of the draught-frame broken away.

Figure 5 is a vertical transverse section, taken through the draught-frame in the plane indicated by red line $x$ $x$ in fig. 2, sheet 1.

Figure 6 is a view in detail of the devices for stopping and starting the rake-arm, showing the tripping-cam thrown up so as not to operate the rake-arm.

Similar letters of reference indicate corresponding parts in the several figures.

This invention relates in part to an improvement on that class of combined rakes and reels which are arranged to revolve in the arc of a circle whose axis is parallel to the plane of the finger-bar, the arm of the rake being supported upon or so applied to the reel-shaft that the rake will operate as a reel or gatherer, and then, when it is brought near the platform, it will sweep over the same, and deliver the cut grain upon the ground, after which it will return to its former position for reeling, all of which movements are effected by devices which are automatic in their operation.

It is this class of combined rakes and reels to which the first part of my invention and improvements relates, and I so wish it to be understood.

The second part of my invention relates to an improvement on harvesters which have their finger-bars secured rigidly to their draught-frames without joints, or in an inflexible manner, so that the platforms and finger-bars shall move together in the operation of the machines, and in adjusting said finger-bars for cutting high or low.

The nature of my invention consists in making that portion of a cam which causes the rake-arm to sweep the grain from the platform during a part of its revolution around the axis of the reel-shaft, adjustable or movable, and providing certain means, in connection therewith, which will enable a person riding upon the machine to move this cam into position for acting upon the rake, or out of such position at pleasure, thereby providing for regulating the size of the gavels in cutting heavy or light grain, by causing said rake to operate as a rake or as a reel at pleasure, as will be hereinafter explained.

The invention also consists in providing for enabling the driver to raise or depress the draught-frame and one end of the finger-bar and platform upon the main driving and transporting-wheel, and at the same time, or simultaneously therewith, enable him to raise or depress the outer or grain-side end of the finger-bar and platform upon a supporting-wheel at this point, by which means the attendant, whilst riding upon the machine, can adjust the finger-bar and platform, and always keep the cutting-apparatus in a plane parallel to the surface of the ground, as will be hereinafter explained.

It also consists in combining with contrivances whereby the attendant can raise or depress the cutting-apparatus bodily at pleasure, certain means which will admit of such adjustments being made without raising or lowering the front end of the draught-pole, as will be hereinafter explained.

To enable others skilled in the art to understand my invention, I will describe its construction and operation.

In the accompanying drawings, A represents the grain-receiver or platform, which is rigidly secured to $n^3$, on arm $n^1$, will, at the same time, be brought against this plate $f$, which will arrest the motion of the rake around the axis of the shaft C, but allow the rake to sweep around in a plane at right angles to the sweep which it makes while acting as a reel or gathering-arm.

To an arm of plate H a rod, $G^2$, is pivoted, which proceeds forward and is again pivoted to the lower end of a lever, $G^1$, that is pivoted to the support K in a position which is convenient to the driver whilst upon his seat G. A spring, $y$, is applied to lever $G^1$, which, when this lever is pressed forward as far as it will go, will be caught by a plate, $y^1$, upon the driver's seat G, and held in this position.

When lever $G^1$ is thus held, the overhanging portion $f$ will be firmly held in a position, shown in figs. 1, 2, 3, 4, and 5, for causing the rake to sweep the grain from the platform A once in every revolution of the reel-shaft.

When the driver desires to prevent the rake from operating as such during more than one revolution of the reel-shaft, he moves the lever $G^1$ backward, which throws up the arresting-portion $f$, as shown in fig. 6, and prevents the arm $n^1$ from being arrested by it.

The spring $g$, on rocking-rod L, is intended to keep the rake bodily up off the platform A when not acting as a rake, so that the rake will clear itself over the fallen grain on the platform.

As the anti-friction roller $n^3$ strikes under the overhanging wing of the arresting-plate H, the spring $g$ yields slightly, just enough to allow the rake to be depressed into such position with relation to the platform as to allow it to rake off the cut grain.

Under the main frame $A^3$ (which may be triangular or rectangular) are two guides, 2 2, shown in fig. 5, which assist in holding the frame E in proper position.

The wing of the arresting-plate is intended, when thrown up, to form a continuous face or cam-plate as far as possible, to prevent the possibility of the crooked arm $n^1$ from dropping out of proper circle when acting as a part of the reel.

Having described my invention, what I claim as new, and desire to secure by Letters Patent, is—

1. The shifting-device $f$, constituting an auxiliary to the cam J, substantially in the manner described, and applied to a combined rake and reel of the character substantially as described, whereby the raking can be stopped and started at pleasure while the reels and rake continue to revolve, substantially as set forth.

2. The combination of the vertically and bodily adjustable frame $A^3$ with the rock-shaft S and the inner and outer supporting-wheels D and $d^3$, substantially in the manner and for the purposes described.

3. The segmental toothed frame E, provided with a latch and lever, and pivoted to the draught-frame $A^3$, said frame having the axle of the supporting-wheel D applied to it, and being attached, by means of a lever, $B^1$, to a pivoted draught-pole, B, so that in the act of raising and depressing the draught-frame the front end of said pole shall remain in one given position, substantially as described.

4. The idler or pulley $E^1$, applied to the vibrating-frame E, so as to maintain proper tension of the belt $C^1$ at all times, substantially as described.

5. The toothed segment-frame E, adapted for suspending the frame $A^3$, and for being geared with toothed pinions $a\ a$, and for being connected to the devices which actuate the wheel $d^3$, substantially as and for the purposes described.

6. The continuously vertically revolving reel-arms $I^1$, intermittent horizontally-sweeping rake $I^2$, and a shifting-device $f$, in combination with a hand-lever, $G^1$, and catching-device $y\ y'$, substantially as described.

E. I. LEYBURN.

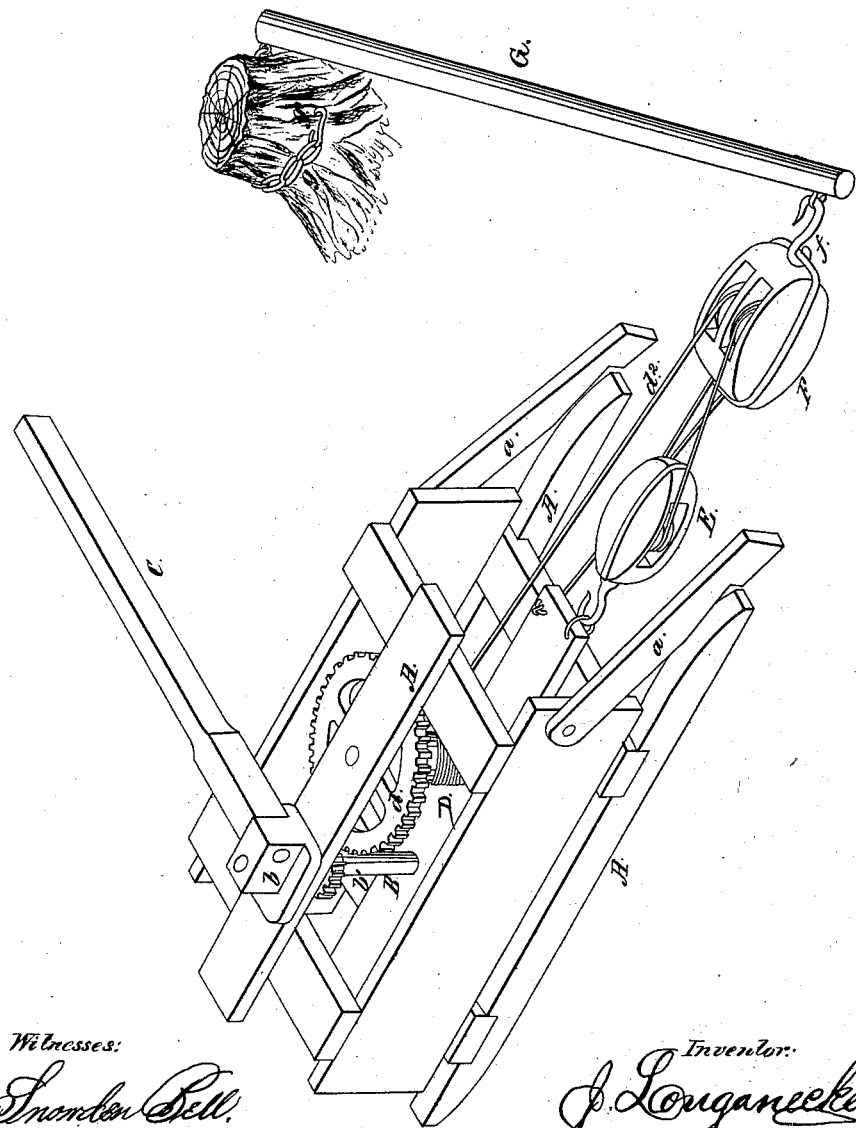

Witnesses:
   J. T. McCRUM,
   W. M. BUMPUS, Jr.